United States Patent [19]
Watzenberger et al.

[11] Patent Number: 5,788,743
[45] Date of Patent: Aug. 4, 1998

[54] SELECTIVE SEPARATION AND RECOVERY OF CHLORINE FROM GAS MIXTURES

[75] Inventors: Otto Watzenberger; Joachim Pfeffinger, both of Ludwigshafen, Germany

[73] Assignee: BASF Aktiengesellschaft, Ludwigshafen, Germany

[21] Appl. No.: 711,907

[22] Filed: Sep. 12, 1996

[30] Foreign Application Priority Data

Oct. 4, 1995 [DE] Germany ............ 195 36 976.9

[51] Int. Cl.$^6$ .................. B01D 53/047; B01D 53/14
[52] U.S. Cl. .............. 95/94; 95/96; 95/132; 95/176; 95/177; 95/182; 95/193; 95/233
[58] Field of Search .......... 95/132, 172, 176–179, 95/182, 193, 209, 233, 96–98, 94

[56] References Cited

U.S. PATENT DOCUMENTS

| | | | |
|---|---|---|---|
| 1,617,305 | 2/1927 | Guyer et al. | 95/132 X |
| 2,271,056 | 1/1942 | Balcar | 23/219 |
| 2,540,905 | 2/1951 | Neubauer et al. | 95/182 X |
| 2,750,002 | 6/1956 | Hooker et al. | 95/177 X |
| 2,765,873 | 10/1956 | Hulme | 95/182 |
| 2,800,197 | 7/1957 | Wynkoop | 95/132 X |
| 2,822,889 | 2/1958 | Sutter | 95/182 |
| 2,868,325 | 1/1959 | Cathala | 95/176 X |
| 2,909,240 | 10/1959 | Colton | 95/177 |
| 2,934,167 | 4/1960 | Hesselgesser | 95/132 |
| 3,029,575 | 4/1962 | Eng et al. | 95/132 |
| 3,315,440 | 4/1967 | Alkemade | 95/182 X |
| 3,399,537 | 9/1968 | Honigh | 95/233 X |
| 3,881,893 | 5/1975 | Badhwar | 95/182 X |
| 4,394,367 | 7/1983 | Foster | 423/502 |
| 5,102,638 | 4/1992 | Girrbach et al. | 423/241 |
| 5,254,323 | 10/1993 | Itoh et al. | 95/178 X |
| 5,296,017 | 3/1994 | Kono et al. | 95/132 X |
| 5,302,187 | 4/1994 | Itoh et al. | 95/132 X |
| 5,308,383 | 5/1994 | Rowe | 95/182 |
| 5,376,164 | 12/1994 | Zarchy et al. | 95/132 X |
| 5,437,711 | 8/1995 | Kaplin et al. | 95/182 |
| 5,500,035 | 3/1996 | Zarchy et al. | 95/132 X |

FOREIGN PATENT DOCUMENTS

| | | | |
|---|---|---|---|
| 0615106 | 2/1961 | Canada | 95/179 |
| 329 385 | 8/1989 | European Pat. Off. . | |
| 518 553 | 12/1992 | European Pat. Off. . | |
| 1012810 | 12/1965 | United Kingdom | 95/182 |

OTHER PUBLICATIONS

Schmittinger et al., Ullmann's Enzyklopadie der technischen Chemie, Chlor. vol. A6 (1986) 399–481.
Quant et al., The Chemical Engineer, (1963), 224–232.

*Primary Examiner*—Robert Spitzer
*Attorney, Agent, or Firm*—Keil & Weinkauf

[57] ABSTRACT

A process for separating chlorine of high purity from a chlorine-containing feed gas by absorption of the chlorine using an inert absorbent and downstream desorption of the chlorine from the absorbent/chlorine mixture drawn off from the absorption stage by the supply of mixture to a desorption distillation column which is coupled to a chlorine separation column in such a way that the top of the chlorine separation column and an upper section of the desorption distillation column and a lower section of the desorption distillation column and the bottom of the chlorine separation column are connected to one another on both the gas and the liquid side, the absorbent/chlorine mixture being supplied exclusively to the desorption distillation column, and high-purity chlorine being drawn off from a middle region of the chlorine separation column.

13 Claims, 9 Drawing Sheets

PURIFYING DISTILLATION OF CHLORINE

SELECTIVE SEPARATION AND RECOVERY OF CHLORINE FROM GAS MIXTURES

The invention relates to processes for separating and recovering chlorine from mixtures of gases.

It is known that, in the course of chlorinating organic compounds, large quantities of hydrogen chloride are formed. For example, the production of the isocyanates which form the raw materials base for foam and coatings entails the formation of between 0.5 and 1.0 t of hydrogen chloride per tonne of product.

The recycling of chlorine from these processes or other process gases or flushing gases is undertaken in various ways. In the case of electrolysis, for example, the hydrogen chloride is first of all converted to aqueous hydrochloric acid and then cleaved electrolytically into chlorine and hydrogen, the chlorine being obtained in concentrated form.

If, on the other hand, in a process which is energetically more favorable than electrolysis, the hydrogen chloride is oxidized to chlorine and water by one of the variants of the Deacon process, only a dilute stream of chlorine gas is obtained, with a chlorine content of 10–50% by volume. This dilute stream must then be aftertreated, since chemical production requires dry chlorine having a high purity of more than 99% by weight.

There has therefore been no lack of attempts to separate as much of the chlorine as possible from dilute chlorine gas streams to give a separated fraction of high purity.

Figure 1:
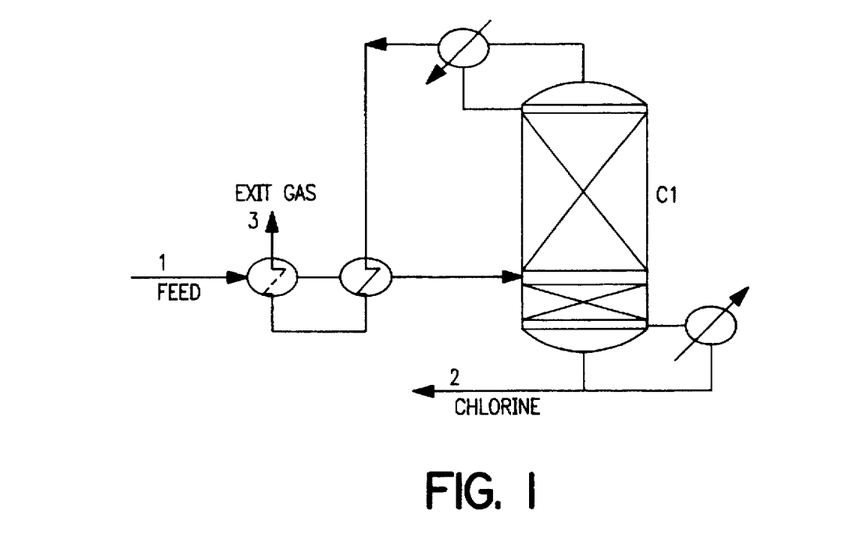
FIG. 1 shows a diagram of a chlorine separation unit.
Figure 2:
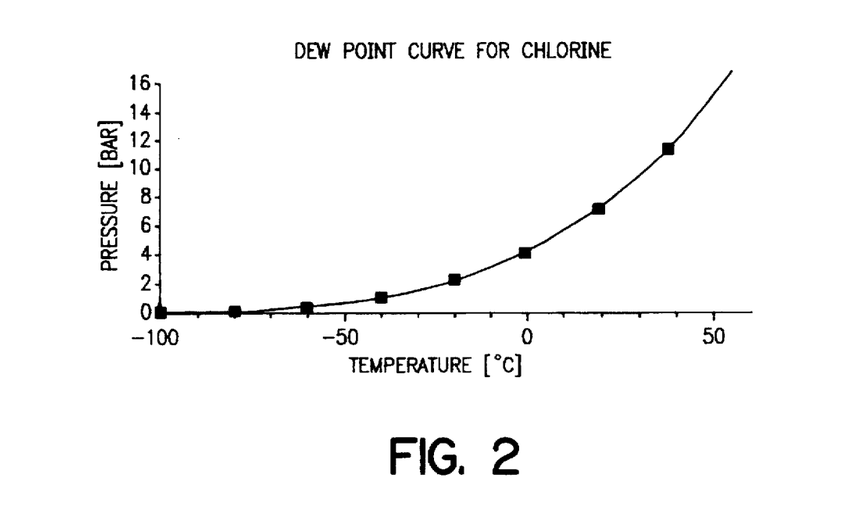
FIG. 2 shows a dew point curve for chlorine.

For example, chlorine can be separated by being condensed out of a dried gas stream (cf. FIG. 1, Ullmanns Enzyklopadie der techn. Chemie, Chlor [chlorine], Vol. A6 (1986), 399–481). Since the condensation temperature of chlorine is dependent on pressure (cf. FIG. 2), the condensation is for economic reasons carried out under a pressure which, for safety reasons, should not exceed 5–10 bar.

At this pressure, however, chlorine cannot be condensed out economically by low-temperature condensation from gases of low chlorine concentration, especially if the current statutory emission values in the exit gas 3 are to be observed. In this case, the gas stream must be cooled to below $-130°$ C. so as not to exceed a chlorine concentration of 5 mg/m$^3$ in the exit gas 3 (corresponding to a partial pressure of 0.16 Pa). This can only be achieved with a very high input of refrigeration energy, and is therefore uneconomic. Consequently, for large-scale industrial applications, condensation is only a separation or purification method for separating chlorine from chlorine gas streams having very high chlorine contents, preferably above 95%. The residual chlorine in the exit gas 3 is then removed in accordance with the prior art, for example by scrubbing.

Scrubbing of this kind for removing residual chlorine, using NaOH and/or Na$_2$/SO$_3$, is described for example in EP-B 0 406 675. However, the chemical scrubbing removes the possibility of reusing the chlorine, and in addition produces a corresponding quantity of salts which require disposal in accordance with regulatory provisions.

Figure 3:
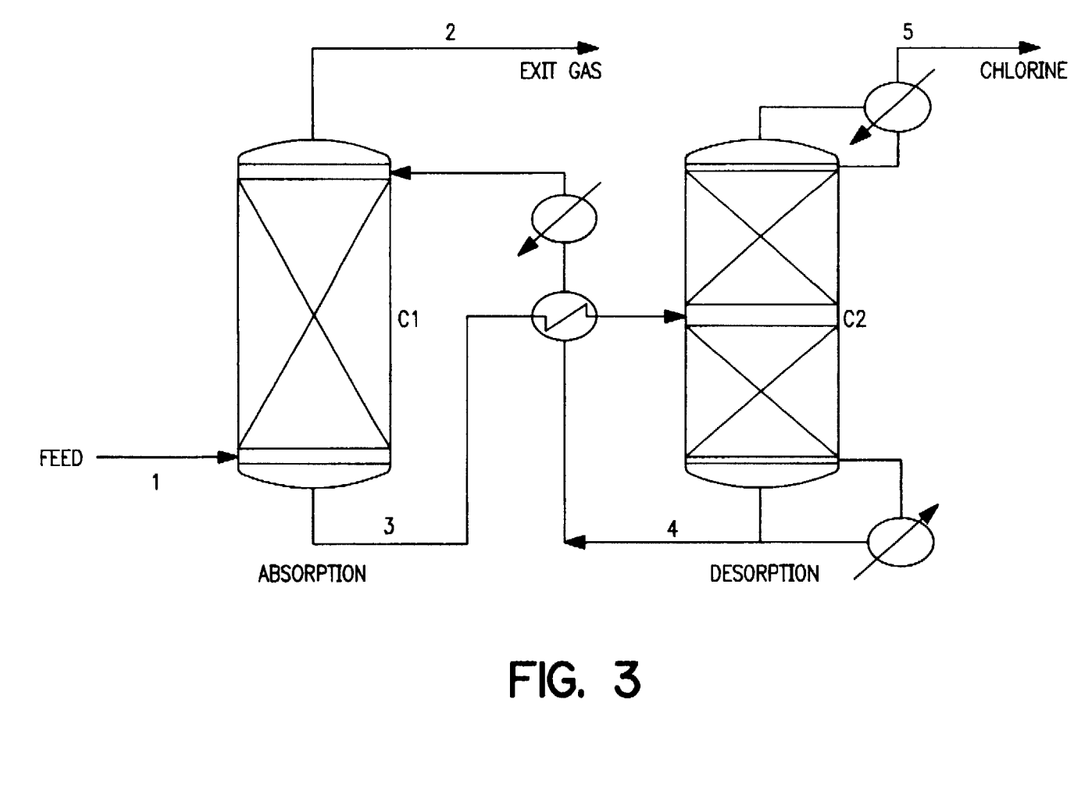
FIG. 3 shows an absorption/desorption plant for chlorine recovery.

A further process variant consists in obtaining the chlorine with the aid of absorption methods (cf. FIG. 3). In the absorption methods, the chlorine-containing feed gas 1 is passed in an appropriate manner into the bottom of an absorption column C1 which is customarily fitted out with packing materials (Berl saddles, Raschig rings, or the like) or with appropriate column trays. An absorbent, for example CCl$_4$, hexachlorobutadiene, various partially chlorinated or perchlorinated propanes or S$_2$Cl$_2$ (chemical scrubbing: S$_2$Cl$_2$+Cl$_2$→2 SCl$_2$) is passed in countercurrent to the chlorine-containing feed gas and absorbs the chlorine from the gas stream. Absorption takes place at from 0.5 to 1 bar or under pressure, preferably at 5–10 bar. The feed temperature of the absorbent 4 at the top of the column is chosen, as a function of the respective absorbent, such that the residual chlorine content in the exit gas 2 at the top of the column is below the required limit. If the chosen temperature of the absorption column is higher, then the removal of residual chlorine from the exit gas 2 necessitates the provision of a residual chlorine scrubber as described above.

The chlorine-loaded absorbent 3 is drawn off at the bottom of the absorption column C1 and passed into the desorption column C2, in which the chlorine absorbed by the absorbent is expelled from the absorbent by heating and/or pressure reduction. The absorbent 4, freed from chlorine, is drawn off at the bottom of the desorption column, cooled and recycled through the absorption column. Part of the chlorine 5 drawn off at the top of the desorption column is condensed and passed back into the column as a return flow.

The chlorine 5 drawn off from the desorption column contains not inconsiderable proportions of uncondensable gas components from the feed gas and in addition, depending on the pressure and temperature conditions at the top of the desorption column, a relatively large quantity of absorbent, so that the purity which can be achieved is inadequate for the majority of applications, and additional purification of the chlorine obtained is therefore necessary.

A typical absorption-desorption process is described in U.S. Pat. No. 5,308,383. Its characteristic feature is the use of a specific absorbent of empirical formula $C_7F_3H_{4-n}Cl_n$ where n=1–3, for example 3,4-dichlorobenzotrifluoride. An advantage of the use of this absorbent, according to U.S. Pat. No. 5,308,383, is the lower absorbent loss of only 88 mg/kg of gas, and also the lack of ozone destruction potential, in contrast to CCl$_4$. In addition, U.S. Pat. No. 5,308,383 states that a combination of the abovementioned absorbents with chloroform is particularly suitable. However, it is then necessary to establish an absorber overhead temperature of $-4°$ C. in order to limit the losses of chloroform, since chloroform has an ozone destruction potential.

It is known that the absorption of chlorine in the customary absorbents, for example CCl$_4$, takes place by physical dissolution. Since this process step is relatively unselective, a certain proportion of the other gas components in the feed gas is also absorbed. As a consequence, the chlorine obtained, although concentrated, is contaminated with other gas components and absorbent and must be subjected to a further purification, for example low-temperature distillation.

Figure 4:
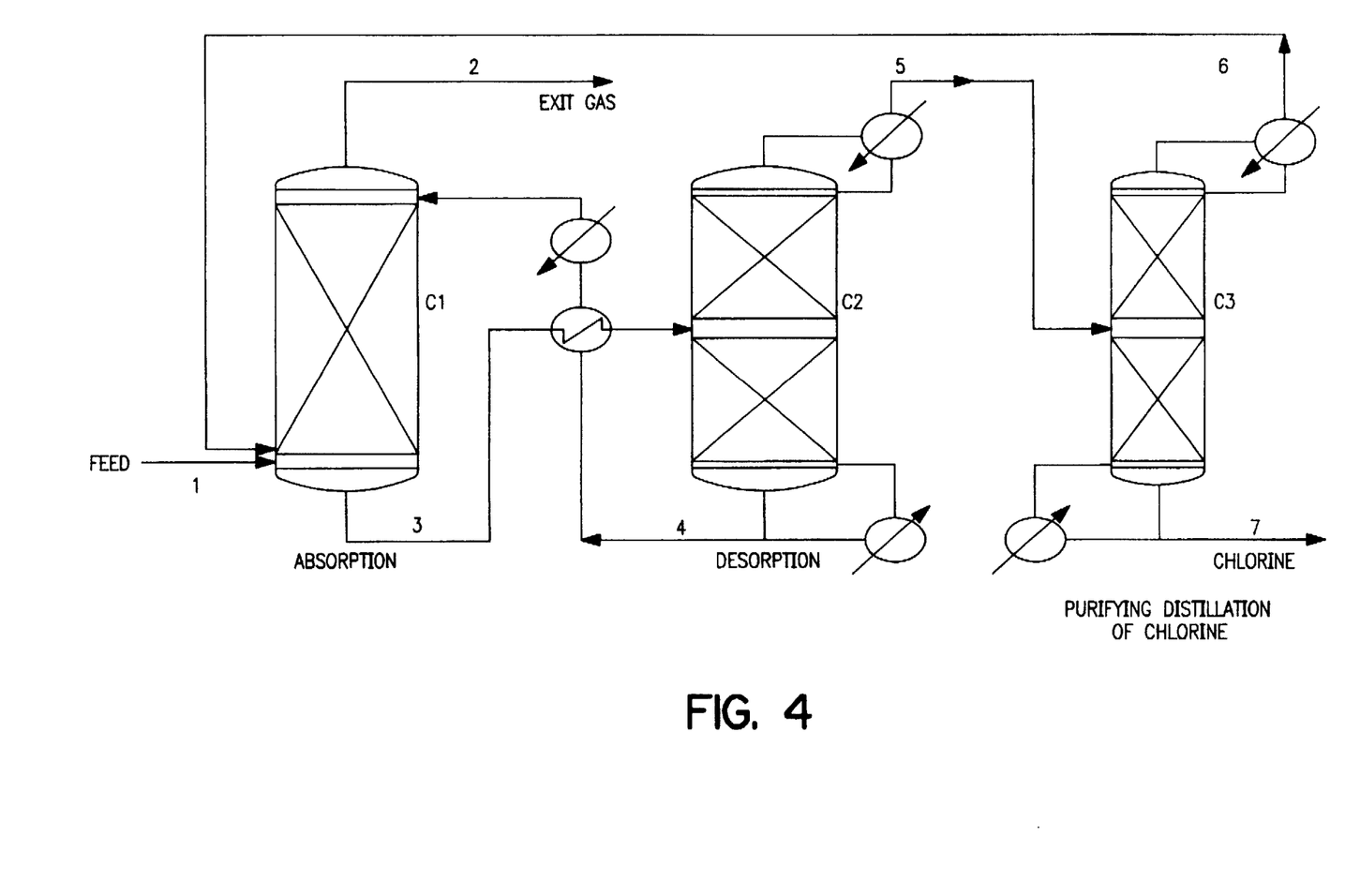
FIG. 4 shows a diagram as in FIG. 3 with purifying distillation of chlorine.

FIG. 4 shows a flow diagram of the absorption/desorption process with downstream low-temperature distillation. In the absorption column C1, an appropriate absorbent 4 is used to scrub chlorine quantitatively from the chlorine-containing feed stream 1. The loaded absorbent 3 is passed into a desorption column C2 in which chlorine is expelled by heating the absorbent and is distilled off at the top 5. The regenerated absorbent 4 is cooled and recycled to the absorption column C1.

The chlorine gas 5 drawn off from the top of the desorption column C2 is, as already mentioned, of low purity and must therefore be purified, for example by extractive condensation in a low-temperature distillation column C3. The uncondensable gases 6 still contain small quantities of chlorine and are therefore passed back into the chlorine absorption column C1.

The disadvantage of this process is that high-purity chlorine 7 can only be drawn off when the desorption column is operated such that no absorbent emerges at the top, since this absorbent would, as a "high boiler", pass into the bottom of the low-temperature distillation column and therefore into the chlorine 7 drawn off.

In accordance with the Shell-Deacon process for HCl oxidation (The Chemical Engineer, (1963) 224–232), chlorine is separated off by an absorption/desorption process using $CCl_4$ as absorbent. From the feed gas, with a chlorine content of 27–48% in $N_2$, $O_2$ and $CO_2$ (mainly), the chlorine is scrubbed out in the absorption column at about 1.5 bar and at an overhead temperature of about 11° C. Liberation of the chlorine from the absorption liquid takes place in the desorption column at an overhead temperature of about 65.5° C. under a pressure of about 11 bar. The liberated chlorine is purified by partial condensation under pressure in a top-mounted water condenser. The uncondensed chlorine and the other gas components which are still present therein are passed back to the absorption column. A similar process variant is described in U.S. Pat. No. 4,394,367.

U.S. Pat. No. 2,271,056 proposes the installation of a layer of active charcoal in the upper part of the absorption column in order to prevent the emission of $CCl_4$. A disadvantage is that the active charcoal has only a limited adsorption capacity and must then be replaced.

Figure 5:
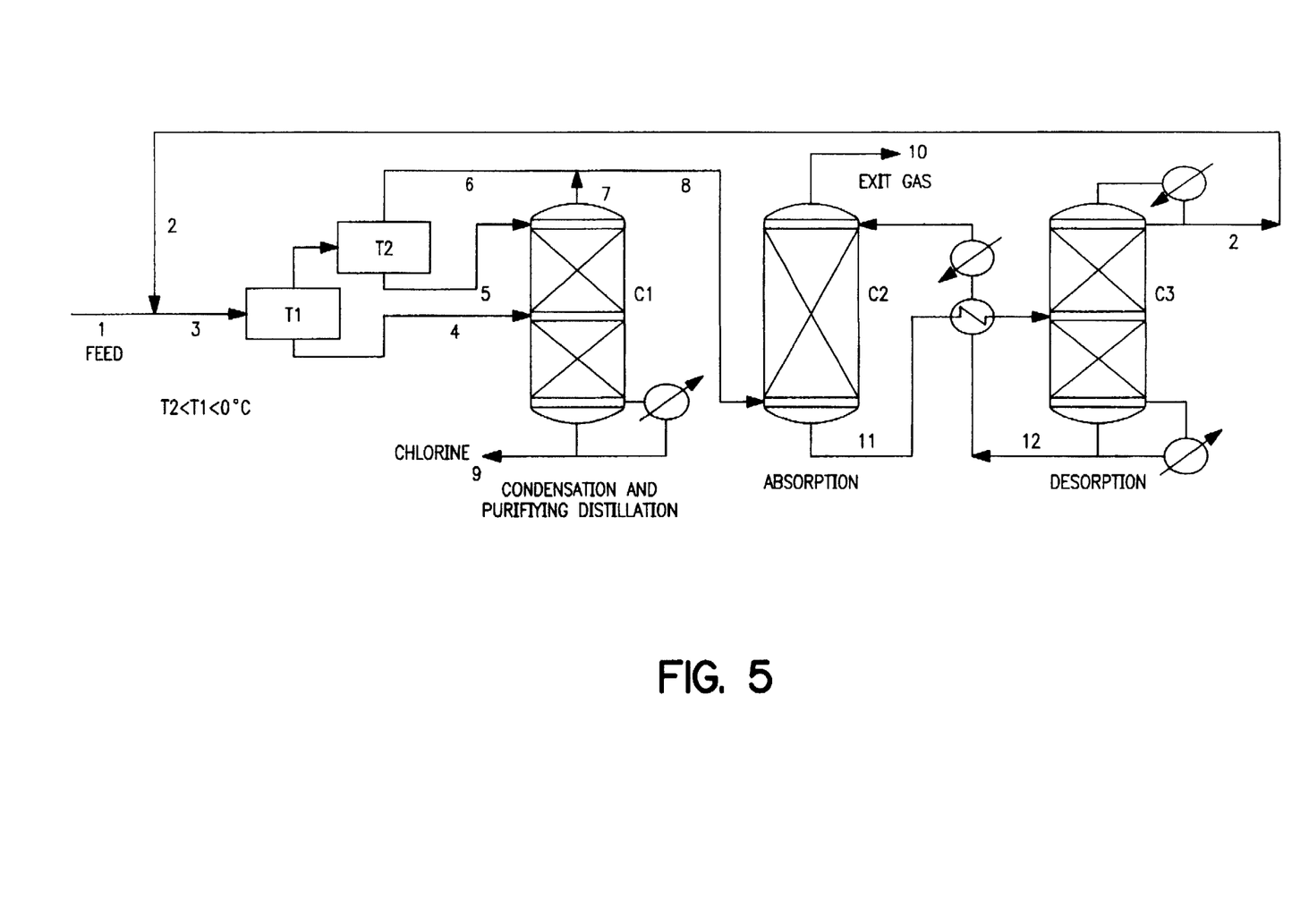
FIG. 5 shows a diagram of the overall process.

An alternative proposal for separating chlorine by absorption and subsequent desorption is described in EP-B 0 329 385 and shown in FIG. 5. In this process variant, the original, chlorine-containing feed gas 1, with a chlorine concentration of about 10–30% by weight, has added to it the chlorine 2 from the chlorine desorption stage (about 90% by weight chlorine). This increases the concentration of chlorine in the feed stream 3 to markedly above 50% by weight. This gas stream 3 is compressed to 5–9 bar and then cooled in one or more stages, so that a large part of the chlorine present condenses out. The chlorine condensed out is passed to the low-temperature distillation column C1 in order to separate off the dissolved extraneous gases. The chlorine 9 purified and separated in this way can be reused. The uncondensable gases 7 from the low-temperature distillation column C1 still contain chlorine and are therefore combined with the uncondensable gas stream from the preceding condensation 6 and passed into the absorption column C2, in which the chlorine is separated by absorption from the uncondensable gas components. The loaded absorbent 11 is regenerated in a desorption column C3, by boiling to extract the chlorine. The chlorine 2 desorbed in this stage is of low purity (about 90% by weight chlorine). It still contains relatively large quantities of uncondensable gases which were likewise dissolved in the absorbent. This chlorine stream 2 is added to the chlorine-containing feed gas 1.

The process can only be used advantageously for recovering the chlorine from chlorine-containing gas streams 1 having chlorine contents of markedly above 10% by volume, since otherwise uneconomically large quantities of chlorine must continually be circulated between the absorption/desorption and condensation stages.

A further disadvantage is that the process is not suitable for obtaining high-purity chlorine, since the chlorine-rich gas mixture 2 from the desorption column C3 contains small quantities of absorbent. The addition of the gas mixture to the feed gas 1 means that the absorbent passes into the condensation section and, via this section, into the low-temperature distillation stage, in which as a high-boiling component it is drawn off together with the chlorine from the bottom of the column. An energy disadvantage of this process variant, furthermore, is that the entire uncondensable gas component has to be cooled to the low chlorine condensation temperature.

EP-A 0 518 553 describes a low-temperature distillation with subsequent vacuum pressure swing adsorption for separating chlorine.

Figure 6:
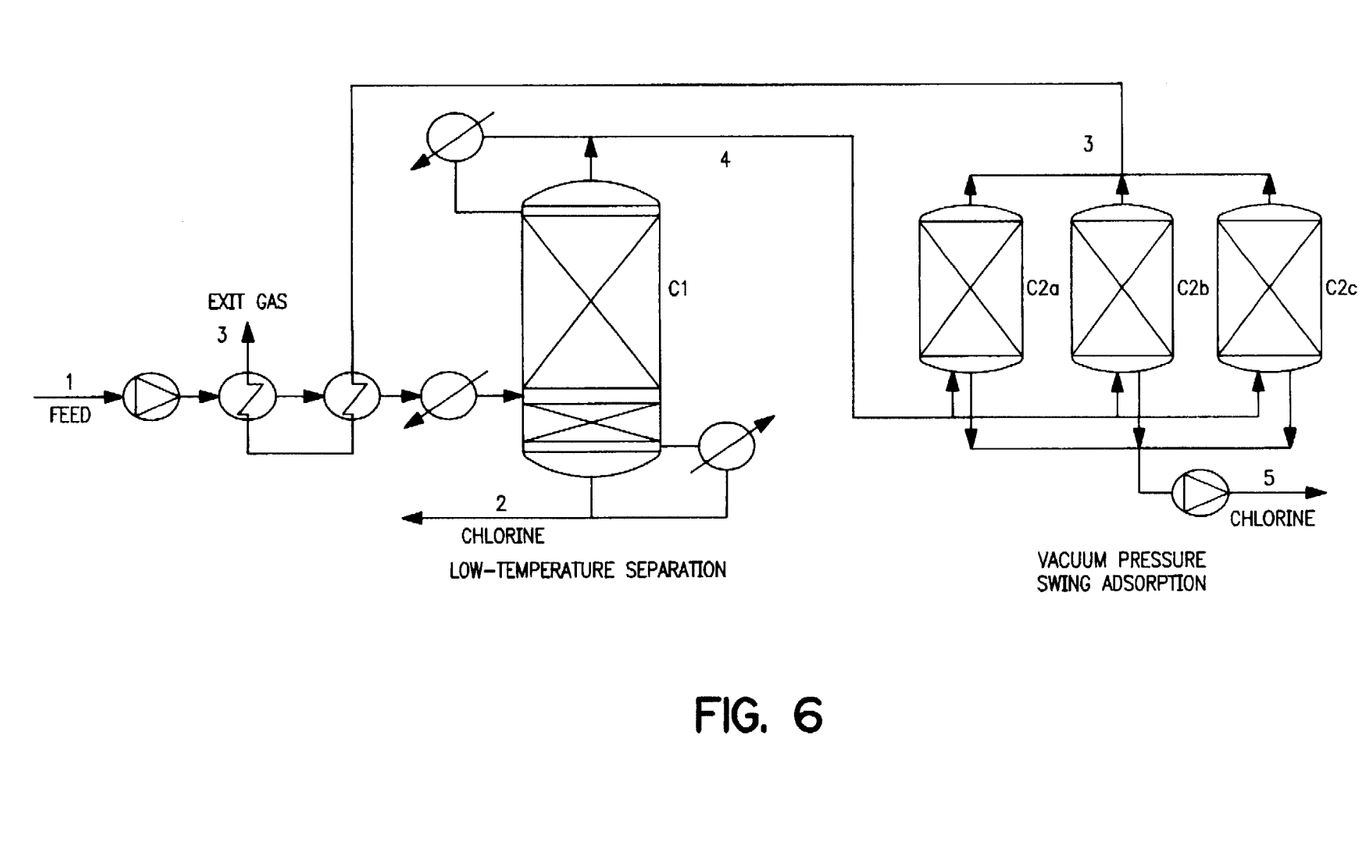
FIG. 6 shows a diagram of a chlorine recovery plant with pressure swing adsorption.

The feed gas 1 is compressed and, as shown in FIG. 6, is first of all cooled with the chlorine-free exit gas 3, and then passed to the condensation or low-temperature distillation C1, in which part 2 of the chlorine present can be drawn off at the bottom in pure liquid form. The remaining chlorine-containing gas 4 leaves the column C1 via the top and is passed into the vacuum pressure swing adsorption (VPSA) container C2. In the adsorption container C2a to C2c the adsorptive separation of the chlorine from the residual gases takes place in alternation at about 4–11 bar and 0°–150° C., preferably ambient temperature. By subsequent application of vacuum at a reduced pressure of 1–60 kPa, in alternation to the adsorption, highly concentrated chlorine 5 is obtained from the adsorption towers. Following the desorption of the adsorbed chlorine, the adsorption containers are again available for renewed charging. Adsorbents which can be employed are synthetic or natural zeolites (X, Y, L, ZSM) or nonzeolitic porous oxides and preferably carbon-based adsorbents, such as active charcoal and carbon molecular sieves.

This procedure, however, is unsuitable for obtaining all of the chlorine in high-purity form from the feed gas, since the gas phase present in the adsorption container still contains all the gaseous components of the gas stream 4, and not only chlorine but other components of the gas are likewise partially adsorbed as well. When the vacuum is applied, these components pass together with the desorbing chlorine into the chlorine stream 5 which emerges from the adsorption containers.

Only the chlorine 2 from the condensation/low-temperature separation stage is obtained in pure form. Owing to the technically and economically limited cooling temperature, however, this chlorine 2 is only a limited is proportion, depending on the chlorine concentration of the entering gas. In order to obtain all of the chlorine in pure form from a VPSA, the separated chlorine 5 must be subjected to a further purification stage.

The insertion of a condensation/low-temperature distillation prior to the VPSA, furthermore, has the disadvantage that the entire chlorine-containing feed gas stream obtained has to be compressed to the high chlorine condensation pressure (5–20 bar) and cooled to the corresponding chlorine condensation temperature.

It was therefore an object of the present invention to find processes for the removal of chlorine from chlorine-containing gas streams, by means of which processes the chlorine can be separated completely and in high-purity form, and which are energetically optimized, can be carried out with a minimal amount of apparatus and in which the exit gas leaving the chlorine separation plant is free of absorbents and virtually free of chlorine.

We have found that this object is achieved in a process for separating chlorine of high purity from a chlorine-containing feed gas by absorption of the chlorine using an inert absorbent and downstream desorption of the chlorine from the absorbent/chlorine mixture drawn off from the absorption stage by the supply of said mixture to a desorption distillation column, which comprises carrying out the desorption distillation in a desorption distillation column which is coupled to a chlorine separation column in such a way that the top of the chlorine separation column and an upper section of the desorption distillation column and a lower section of the desorption distillation column and the bottom of the chlorine separation column are connected to one another on both the gas and the liquid side, the absorbent/chlorine mixture being supplied exclusively to the desorption distillation column, and high-purity chlorine being drawn off from a middle region of the chlorine separation column.

Preferred embodiments of the invention are described below and illustrated in the drawing, where.

In an advantageous embodiment of the process according to the invention, desorption distillation is carried out in a desorption distillation column with a side column as chlorine separation column.

In a further advantageous embodiment of the process according to the invention, the desorption distillation column and the chlorine separation column are integrated in one column, part of which has a partitioning device, e.g. a partitioning wall, which is effective in the lengthwise direction and which divides the cross-section of the column into a feed section and a withdrawal section, the chlorine/absorbent mixture being put into the feed section and liquid chlorine being drawn off from the withdrawal section.

In a particularly advantageous embodiment of the process according to the invention, the chlorine absorbent is separated off from the exit gas emerging from the chlorine absorption stage, by scrubbing the gas stream emerging from the absorption stage with the aid of a preferred inert washing liquid which has a vapor pressure of less than 10 mbar, preferably less than 1 mbar, at room temperature and distilling the loaded washing liquid, for regeneration, in a distillation column at a pressure of 0.1–5 bar, preferably 1–2 bar, the washing liquid being drawn off at the bottom and passed back, preferably to the scrubbing stage, and the off-gases leaving at the top being passed to the chlorine absorption stage. In accordance with the invention it is also possible to carry out the removal of residual chlorine and/or residual absorbent from the exit gas of the absorption column by means of appropriate adsorption methods (for example adsorption of chlorine and $CCl_4$ on active charcoal).

A further inventive solution for separating chlorine from a chlorine-containing gas stream comprises separating the chlorine completely or almost completely from the gas stream by means of pressure swing adsorption, compressing the highly chlorine-containing gas from the pressure swing adsorption to a pressure of 1–20 bar, preferably 5–10 bar and is then preferably subjected to a low-temperature distillation, separating off chlorine in pure form as the bottom product of the distillation column and passing back the top product of the distillation column to the feed gas stream of the pressure swing adsorption.

The process according to the invention enables the following advantages to be obtained:

The complete separation of chlorine from chlorine-containing gas streams with minimal apparatus and energy input. This applies in particular to the recovery of chlorine from highly diluted chlorine gas streams as are produced in the oxidation of HCl with oxygen by the Deacon process.

The chlorine separated off is of high purity and can be recycled to the production process. For instance, the chlorine can be reused for the preparation of phosgene, which is required in isocyanate production.

A chlorine absorbent is either not required at all, as in the case of vacuum pressure swing adsorption, or remains in the process without losses into the environment.

Figure 7:
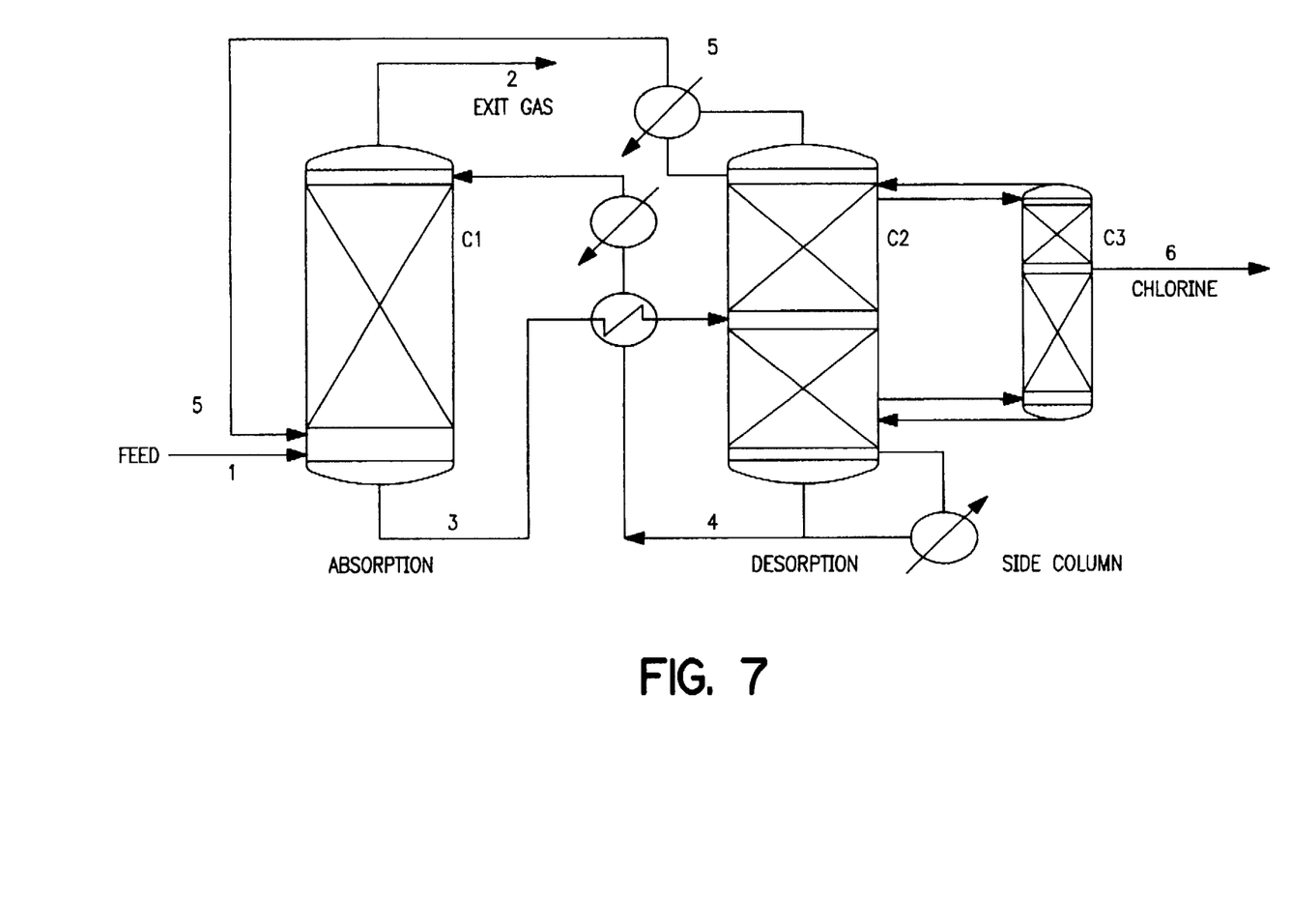
FIG. 7 shows a diagram of a chlorine recovery plant with chlorine side column.

An advantageous form of the process according to the invention for obtaining high-purity chlorine is shown in FIG. 7. The feed gas 1 is passed in a suitable manner into the base of an absorption column C1 which is customarily fitted out with packing materials (Berl saddles, Raschig rings, or the like) or with appropriate column trays. An absorbent 4 is passed in countercurrent to the chlorine-containing feed gas and absorbs the chlorine of the gas stream, which is subsequently passed out of the plant as exit gas 2 via the top of the absorption column. The chlorine-loaded absorbent 3 is passed into a desorption distillation column C2 in which the chlorine is again distilled off and the absorbent 4, freed from chlorine, is drawn off at the bottom of the desorption distillation column, cooled and recycled to the absorption column. From the lower part of the desorption distillation column C2, vapors are drawn off and are passed into the bottom of a side column, the chlorine separation column C3. From the upper part of the desorption distillation column C2, liquid is drawn off and is passed to the top of the side column C3. The vapors drawn off from the side column C3 are passed back, at the site of withdrawal of liquid, into the desorption distillation column C2, while the material drawn off at the bottom of the side column is passed back, at the site of the withdrawal of vapors, into the desorption distillation column. Liquid chlorine 6 in highly pure form, free from residual gas and from absorbent, can be drawn off from the middle part of the side column. The residual gas components codissolved in the loaded absorbent 3 leave the desorption distillation column, along with small quantities of chlorine, via the top 5 and are passed back into the absorption column C1.

Figure 8:
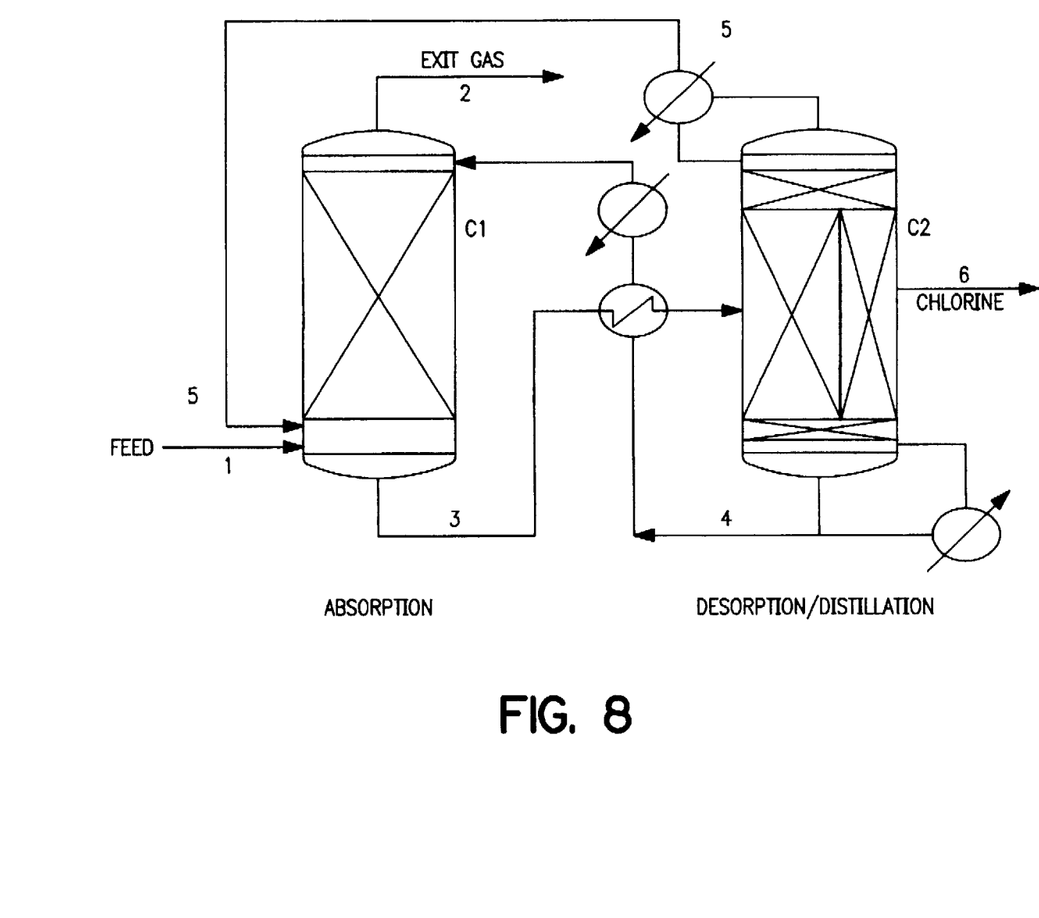
FIG. 8 shows a diagram of a chlorine recovery plant with partition column.

A particularly advantageous embodiment of the process according to the invention for obtaining high-purity chlorine is shown in FIG. 8. Chlorine is separated from the feed gas, as shown in FIG. 7, with the absorption column C1 and is distilled off again from the absorbent in the desorption distillation column C2. The desorption distillation column is configured as a partitioned column. This corresponds in principle to an integration of the side column described in FIG. 7, the chlorine separation column, into the desorption distillation column. In the region of the column separated by the partitioning wall, a concentration profile like that in the side column is established. The optimum height at which high-purity liquid chlorine 6 can be drawn off is a function of the composition of the loaded absorbent and the configuration of the column. The height of the partitioning wall should be more than 5 theoretical plates, but should not be more than the overall height, preferably 10–90%, particularly preferably 60–70%, of the height, of the effective part of the desorption distillation column. This applies even if the chlorine separation column is in the form of a side column. Above and below the partitioning wall, the two columns are coupled to one another on the gas side and the liquid side.

By using the partitioned column instead of a side column, the separation apparatus is reduced by one unit and there is a considerable saving in energy.

Figure 9:
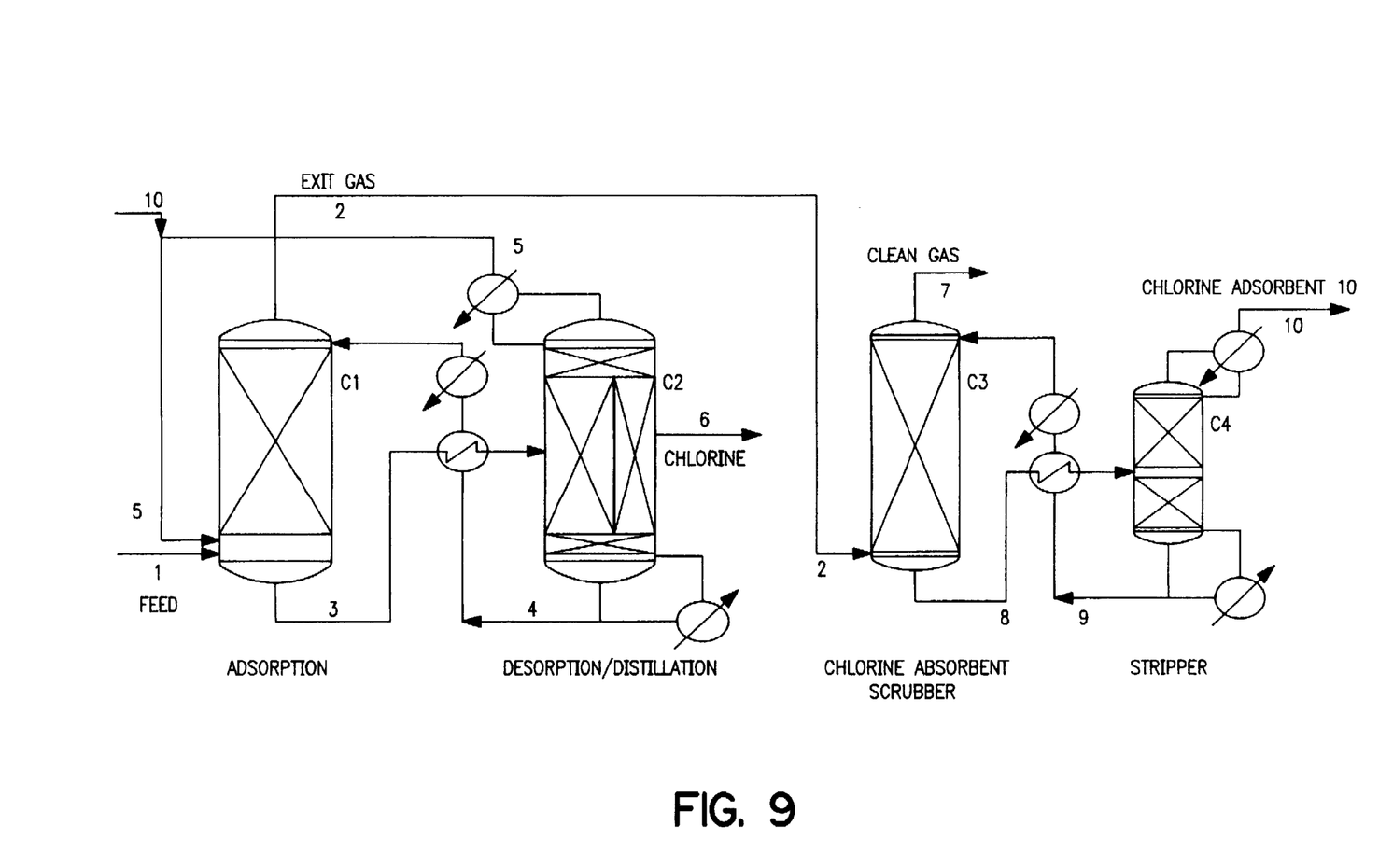
FIG. 9 shows a diagram, corresponding to FIG. 8, of an exit-gas processing unit.

Another particularly advantageous embodiment of the process according to the invention, in which not only is high-purity chlorine separated in accordance with FIG. 8 but also the exit gas 2 from the absorption column is freed from any chlorine absorbent, as far as still present, is shown in FIG. 9.

The exit gas 2, which is led from the top of the absorption column C1, may still contain some chlorine absorbent, such as $CCl_4$, which is scrubbed out completely in the absorption column C3 by means of an appropriate washing liquid 9, for example cis- or trans-decalin or another apis propriate high-boiling substance. The clean gas 7 from the absorption column C3 can be emitted to the environment or returned to the process for the oxidation of HCl with $O_2$. In a downstream desorption column C4, the chlorine absorbent is distilled off again from the loaded washing liquid 8, and the washing liquid is drawn off as bottom product 9, cooled and passed back to the absorption stage C3. The top product 10 obtained is a gas mixture which is passed to the absorption column C1, for example, together with stream 5.

Figure 10:
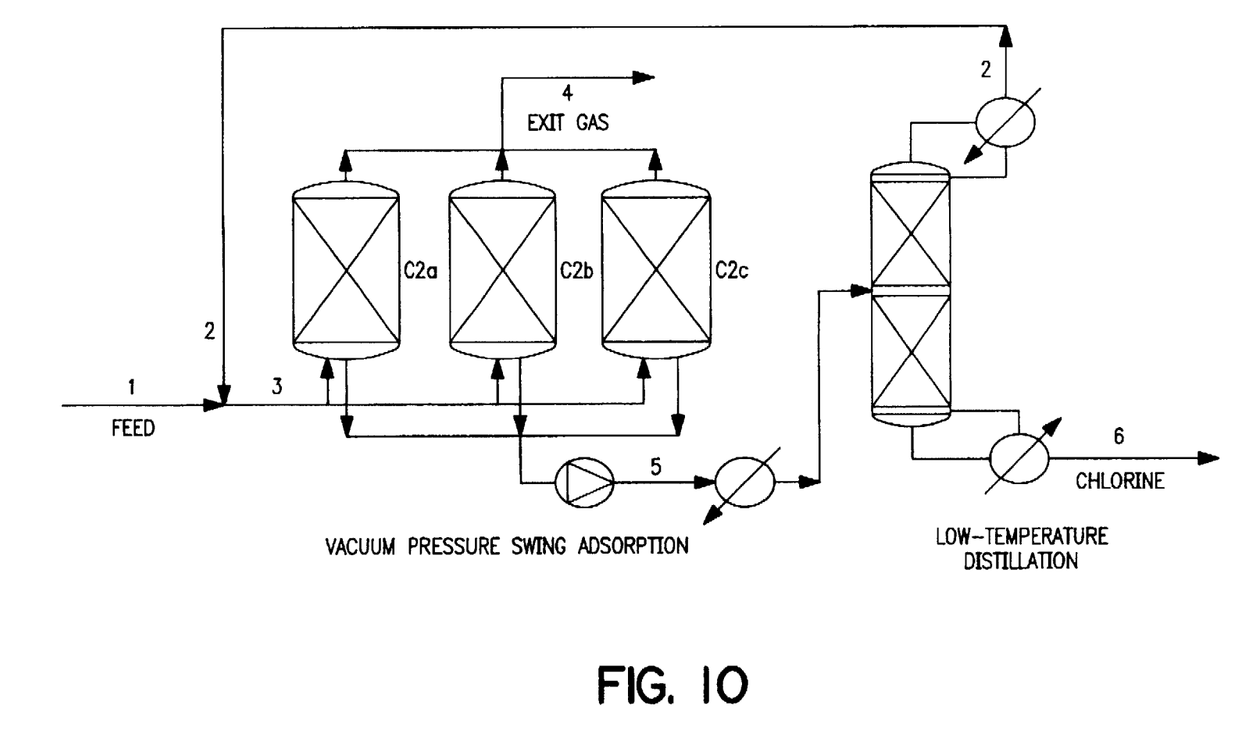
FIG. 10 shows a diagram of a chlorine recovery plant with low-temperature distillation downstream of the pressure swing adsorption.

According to a further inventive process for the recovery of high-purity chlorine, vacuum pressure swing adsorption (V-PSA) is used to separated chlorine from a chlorine-containing entering gas, as shown in FIG. 10. The feed gas 1 is first of all compressed. The separation of the chlorine from the residual gases takes place cyclically in the containers C2a to C2c by adsorption. By anticyclical application of vacuum, highly concentrated chlorine 5 is obtained from the adsorption towers. After the desorption of the adhering chlorine, the adsorber towers are again available for renewed charging. The gas phase in the adsorption container still contains all of the gaseous components of the entering gas. When the vacuum is applied, these components pass, together with the desorbed chlorine, into the chlorine stream 5 emerging from the adsorption containers, which is compressed and then, after cooling, passed to a low-temperature distillation stage C3. In this stage, the unwanted gaseous components which are still present are removed by distillation. High-purity chlorine 6 can be drawn off in liquid form from the bottom of the column. The residual gases 2 drawn off at the top still contain chlorine and are returned to the V-PSA stage. The residual gas stream, however, is only small.

EXAMPLES

Comparison Example C1:

Absorption-desorption (Process in accordance with FIG. 3)

A chlorine-containing gas stream with a composition of 17.1% by weight $Cl_2$, 0.5% by weight HCl and 82.4% by weight $N_2+O_2$ was supplied with a volume flow of 100 l/h at a pressure of 700 kPa and a temperature of 0° C. (=1.1 kg of gas/h; =0.2 kg of $Cl_2$/h) to the absorption column. The absorption column had an internal diameter of 40 mm and an overall height of 1.3 m. The column internals used were 5×5 mm Pall rings in a bed height of 1.0 m. Liquid $CCl_4$ was applied at the top of the column at a temperature of −20° C. and at a rate of 2.7 kg/h. The chlorine-loaded absorbent was passed to a desorption column having an internal diameter of 40 mm, an overall height of 1.5 m and a 1.3 m bed of Pall rings (5×5 mm). At a pressure of 700 kPa, a bottom temperature of 160° C. and an overhead temperature of 16° C., the top product obtained from the desorption column was a chlorine gas having a purity of about 92% by weight. The concentrations of the individual components in gases and liquids are shown in Table 1.

TABLE 1

Gas and liquid concentrations in the recovery of chlorine by absorption/desorption at a pressure of 700 kPa in each case

|  | 1 Feed | 2 Exit gas | 3 Absorbent (loaded) | 4 Absorbent (regenerated) | 5 Chlorine |
|---|---|---|---|---|---|
| kg/h | 1.0 | 0.82 | 2.87 | 2.7 | 0.18 |
| [% by wt.] |  |  |  |  |  |
| Chlorine | 17.1 | 0.40 | 5.80 | 0.00 | 92.2 |
| $CCl_4$ | 0.00 | 1.00 | 93.7 | 100 | 0.00 |
| Residual gas | 82.9 | 98.6 | 0.50 | 0.00 | 7.80 |

The chlorine gas obtained has a purity of only about 92% by weight and must consequently be passed to a further purification stage (distillation). The off-gas from the absorption column still contains, in addition to 0.4% by weight chlorine, 1.0% by weight $CCl_4$.

Example 1

Absorption and desorption with purifying distillation of chlorine in a side column (process according to FIG. 7)

A chlorine-containing gas stream with a composition of 17.1% by weight $Cl_2$, 0.5% by weight HCl and 82.4% by weight $N_2+O_2$ was supplied with a volume flow of 100 l/h at a pressure of 700 kPa and a temperature of 0° C. (=1.0 kg/h), together with a return gas stream from the desorption distillation column, to the absorption column. The absorption column had an internal diameter of 40 mm and an overall height of 1.3 m. Column internals used were 5×5 mm Pall rings in a bed height of 1.0 m. Liquid $CCl_4$ with a temperature of −20° C. was applied to the top of the column at a rate of 3.0 kg/h. The chlorine-loaded absorbent was supplied to the middle part of a desorption distillation column having an internal diameter of 40 mm, an overall height of 1.5 m and a 1.3 m bed of Pall rings (5×5 mm). At a pressure of 700 kPa, a bottom temperature of 160° C. and an overhead temperature of 5° C., the top product obtained was a chlorine gas having a purity of about 78% by weight, which was passed back into the feed gas stream of the absorption column. Vapors were taken off from the desorption distillation column at a height of 0.35 m (calculated from the bottom) and liquid at a height of 1.15 m (calculated from the bottom) and both were supplied to a side column, the chlorine separation column, having an internal diameter of 40 mm, an overall height of 1.0 m and a 0.8 m bed of packing material (5×5 mm Pall rings). Chlorine in liquid form was drawn off from the middle region of this side column. The bottom product and the top product of the side column were supplied to the desorption distillation column at the particular withdrawal trays. The concentrations of the individual components in gases and liquids are shown in Table 2.

TABLE 2

Gas and liquid concentrations in the recovery of chlorine by absorption/desorption with chlorine separation in a side column at a pressure of 700 kPa in each case

|  | 1 Feed | 2 Exit gas | 3 Absorbent (loaded) | 4 Absorbent (regenerated) | 5 Return gas | 6 Chlorine |
|---|---|---|---|---|---|---|
| kg/h | 1.0 | 0.84 | 3.2 | 2.95 | 0.07 | 0.17 |
| [% by wt.] |  |  |  |  |  |  |

TABLE 2-continued

Gas and liquid concentrations in the recovery of chlorine by absorption/desorption with chlorine separation in a side column at a pressure of 700 kPa in each case

|  | 1 Feed | 2 Exit gas | 3 Absorbent (loaded) | 4 Absorbent (regenerated) | 5 Return gas | 6 Chlorine |
|---|---|---|---|---|---|---|
| Chlorine | 17.1 | 0.40 | 7.00 | 0.00 | 77.7 | 100 |
| CCl$_4$ | 0.00 | 1.00 | 92.5 | 100 | 0.00 | 0.00 |
| Residual gas | 82.9 | 98.6 | 0.50 | 0.00 | 22.3 | 0.00 |

Example 2
Absorption and desorption in a partitioned column (process according to FIG. 8)

A chlorine-containing gas stream with a composition of 17.1% by weight Cl$_2$, 0.5% by weight HCl and 82.4% by weight N$_2$+O$_2$ was supplied with a volume flow of 100 l/h at a pressure of 700 kPa at a temperature of 0° C. (=1.0 kg/h), together with a return gas stream from the desorption distillation column, to the absorption column. The absorption column had an internal diameter of 40 mm and an overall height of 1.3 m. Column internals used were 5×5 mm Pall rings in a bed height of 1.0 m. Liquid CCl$_4$ was applied at the top of the column at a temperature of 20° C. and at a rate of 3.0 kg/h. The chlorine-loaded absorbent was supplied to the middle part of a desorption distillation column having an internal diameter of 40 mm, an overall height of 1.5 m and a 1.3 m bed of Pall rings (5×5 mm). This column contained a vertical partitioning wall at a packing height of from 0.35 m to 1.15 m (each calculated from the bottom). At a pressure of 700 kPa, a bottom temperature of 160° C. and an overhead temperature of 5° C., the top product obtained was a chlorine gas having a purity of about 78% by weight, which was passed back into the feed gas stream of the absorption column. Chlorine in liquid form was drawn off from the middle part of the desorption distillation column on the side of the partitioning wall opposite the feed site. The concentrations of the individual components in gases and liquids are shown in Table 3.

TABLE 3

Gas and liquid concentrations in the recovery of chlorine by absorption/desorption in a partitioned column at a pressure of 700 kPa in each case

|  | 1 Feed | 2 Exit gas | 3 Absorbent (loaded) | 4 Absorbent (regenerated) | 5 Return gas | 6 Chlorine |
|---|---|---|---|---|---|---|
| kg/h | 1.0 | 0.84 | 3.2 | 2.95 | 0.07 | 0.17 |
| [% by wt.] | | | | | | |
| Chlorine | 17.1 | 0.40 | 7.00 | 0.00 | 77.7 | 100 |
| CCl$_4$ | 0.00 | 1.00 | 92.5 | 100 | 0.00 | 0.00 |
| Residual gas | 82.9 | 98.6 | 0.50 | 0.00 | 22.3 | 0.00 |

Example 3
Absorptive separation of chlorine absorbent (process according to FIG. 9)

The exit gas 2 from the chlorine absorption column was passed at a rate of 0.84 kg/h, and a temperature of −15° C. with a composition of 1.0 % by weight CCl$_4$, 0.4% by weight Cl$_2$ and 98.6% by weight residual gases (N$_2$+O$_2$, traces of HCl) into an absorption column C$_3$ packed with Pall rings. The column had an internal diameter of 30 mm and a Pall ring height of 1.0 m. Cold cis-decalin at 20° C. was applied as washing liquid at the top of the column at a rate of 0.12 kg/h, thereby scrubbing out the chlorine absorbent CCl$_4$, at an operating pressure of 650 kPa, down to a residual content of less than 1 ppm. The loaded washing liquid was passed into the middle part of a distillation column containing packing material. The distillation column had an internal diameter of 50 mm and an overall height (height of the packing material) of 1.5 m. The packing material used comprised 5×5 mm Pall rings. At a pressure of 100 kPa, a bottom temperature of 200° C. and an overhead temperature of −35° C. the bottom product obtained was cis-decalin with a purity of >99.9% by weight, which after cooling to 20° C. was returned to the scrubber. The top product obtained was a gas stream comprising 2.6% by weight Cl$_2$, 93.8% by weight CCl$_4$ and 3.5% by weight residual gases (N$_2$+O$_2$, HCl), which was passed on to the absorption stage. The concentrations of the individual components in gases and liquids are shown in Table 4.

TABLE 4

Gas and liquid concentrations in the purification of exit gas by absorption and distillation in a partitioned column at a pressure of in each case 650 kPa (absorption) and 100 kPa (distillation)

|  | 2 Exit gas | 7 Clean gas | 8 Solvent (loaded) | 10 Off-gas | 9 Solvent (regenerated) |
|---|---|---|---|---|---|
| kg/h | 0.84 | 0.83 | 0.08 | 0.01 | 0.07 |
| [% by wt.] | | | | | |
| Chlorine | 0.40 | 0.40 | 0.30 | 2.6 | 0.00 |
| CCl$_4$ | 1.00 | 0.00 | 10.7 | 93.8 | 0.00 |
| Decalin | | 0.00 | 88.6 | 0.00 | 100 |
| Residual gas | 98.6 | 96.6 | 0.40 | 3.5 | 0.00 |

Example 4
Vacuum pressure swing adsorption with subsequent low-temperature separation (process according to FIG. 10)

Warm chlorine-containing gas at 25° C. under pressure (500 kPa) with a composition of 17% by weight Cl$_2$ and 83% by weight inert gases (N$_2$+O$_2$) was passed through a bed of adsorber filled with a zeolite-based adsorbent. The loading (space velocity=120 h$^{-1}$) was chosen such that the emerging gas was free from chlorine. The duration of loading was 8 minutes. The adsorber bed was not loaded completely, in order to avoid chlorine breakthrough. After the end of loading, the chlorine-containing gas stream was switched to a second adsorber bed. The first adsorber bed was subsequently let down into the crude chlorine line and then evacuated with a vacuum pump to a pressure of 2 kPa. The underpressure was maintained for about 5 minutes in order to maximize the desorption of the stored chlorine. The crude chlorine (80–90% by volume) drawn off from the adsorber bed was compressed to 800 kPa, cooled to 25° C. and passed into the chlorine condensation column, whose overhead temperature was −50° C. Liquid chlorine, containing >99.0% by weight chlorine, was drawn off at the bottom of the column. The residual gases drawn off at the top from the chlorine condensation column are passed to the feed stream of the adsorber beds.

We claim:

1. A process for separating chlorine of high parity from a chlorine-containing feed gas by absorption of the chlorine using an inert absorbent and downstream desorption of the chlorine from an absorbent/chlorine mixture drawn off from an absorption stage, which process comprises: supplying said mixture to a desorption distillation column and carrying out the desorption distillation in a desorption column which is coupled to a chlorine separation column in such a way that the top of the chlorine separation column and an upper section of the desorption distillation column and a lower section of the desorption distillation column and the bottom of the chlorine separation column are connected to one another on both a gas and a liquid side, the absorbent/chlorine mixture being supplied exclusively to the desorption distillation column, and high-purity chlorine being drawn off from a middle region of the chlorine separation column.

2. A process as defined in claim 1, wherein the chlorine separation column is a side column.

3. A process as defined in claim 1, wherein the chlorine separation column is formed by a vertically extending partitioning wall in the desorption distillation column.

4. A process as defined in claim 1, wherein the chlorine separation column and the desorption distillation column have effective heights and wherein the effective height of the chlorine separation column is 10–90% of the effective height of the desorption distillation column.

5. The process of claim 4, wherein the effective height of the chlorine separation column is 60–70% of the effective height of the desorption distillation column.

6. A process as defined in claim 1, wherein vapors are passed from the lower section of the desorption distillation column into the bottom of the chlorine separation column and liquid is passed from the upper part of the desorption distillation column to the top of the chlorine separation column and wherein the vapors drawn off from the chlorine separation column are passed back into the desorption distillation column at a level at which the liquid is withdrawn from the desorption distillation column and wherein material drawn off at the bottom from the chlorine separation column is passed back into the desorption distillation column at the height at which the vapors are withdrawn.

7. A process as defined in claim 6, wherein the vapors of the desorption distillation column are recycled to the chlorine-absorption stage.

8. The process as defined in claim 1, wherein the absorbent/chlorine mixture drawn off from an absorption step is scrubbed in a scrubbing stage with the aid of an inert washing liquid which has a vapor pressure of less than 10 mbar at room temperature and the washing liquid is distilled, for regeneration, in a desorption distillation column, at a pressure of 0.1–5 bar and the washing liquid thus regenerated is recycled to the scrubbing step and the recovered absorbent is recycled to the chorine absorption stage.

9. A process as defined in claim 1, for the treatment of a chlorine-containing feed gas which results from the oxidation of hydrogen chloride with oxygen.

10. A process as defined in claim 9, wherein the hydrogen chloride comes from the production of isocyanate and the chlorine drawn off is recycled for the preparation of phosgene for the production of isocyanate.

11. A process as defined in claim 9, wherein exit gas from the chlorine absorption stage is recycled, with or without removal of entrained absorbent, to the stage wherein hydrogen chloride is oxidized with oxygen.

12. A process for the separation of pure chlorine from a chlorine-containing gas stream, wherein the chlorine-containing gas stream is initially subjected to a pressure swing adsorption, the chlorine-containing gas from the pressure swing adsorption is compressed to a pressure of 1–20 bar, and is then subjected to a low-temperature distillation, the chlorine being separated off in pure form as bottom product of the distillation column and the top product of the distillation column being passed back into the feed gas stream of the pressure swing adsorption.

13. The process of claim 12, wherein the chlorine-containing gas is compressed to a pressure of 5–10 bar.

* * * * *

UNITED STATES PATENT AND TRADEMARK OFFICE
CERTIFICATE OF CORRECTION

PATENT NO.: 5,788,743

DATED: August 4, 1998

INVENTOR(S): WATZENBERGER et al.

It is certified that error appears in the above-identified patent and that said Letters Patent is hereby corrected as shown below:

Col. 10, claim 1, line 63, delete "parity" and substitute --purity--.

Signed and Sealed this

Twenty-seventh Day of October, 1998

Attest:

BRUCE LEHMAN

*Attesting Officer*    *Commissioner of Patents and Trademarks*